US009413719B2

(12) United States Patent
Litvin (10) Patent No.: US 9,413,719 B2
(45) Date of Patent: *Aug. 9, 2016

(54) MEDIA ACCESS CONTROL ADDRESS TRANSLATION IN VIRTUALIZED ENVIRONMENTS

(71) Applicant: Juniper Networks, Inc., Sunnyvale, CA (US)

(72) Inventor: Moshe Litvin, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/980,110

(22) Filed: Dec. 28, 2015

(65) Prior Publication Data

US 2016/0134589 A1 May 12, 2016

Related U.S. Application Data

(63) Continuation of application No. 14/152,088, filed on Jan. 10, 2014, now Pat. No. 9,258,325, which is a continuation of application No. 12/965,802, filed on Dec. 10, 2010, now Pat. No. 8,640,221.

(60) Provisional application No. 61/285,953, filed on Dec. 11, 2009.

(51) Int. Cl.
*H04L 29/06* (2006.01)

(52) U.S. Cl.
CPC ........ *H04L 63/0245* (2013.01); *H04L 63/0272* (2013.01); *H04L 63/1441* (2013.01)

(58) Field of Classification Search
CPC ................ H04L 63/00–63/02; H04L 63/0227; H04L 63/0245; H04L 63/029; H04L 63/14; H04L 63/1408; H04L 63/1441; H04L 63/16–63/166; H04L 63/18; H04L 63/30; H04L 63/304; H04L 63/306; H04L 61/00; H04L 61/25; H04L 61/2557; H04L 61/2596
See application file for complete search history.

(56) References Cited

U.S. PATENT DOCUMENTS 5,757,924 A 5/1998 Friedman et al.
5,828,846 A 10/1998 Kirby et al.
(Continued)

OTHER PUBLICATIONS

International Search Report and Written Opinion of international application No. PCT/US2010/059975, mailed Mar. 14, 2011, 17 pp.
(Continued)

*Primary Examiner* — Eric W Shepperd
(74) *Attorney, Agent, or Firm* — Shumaker & Sieffert, P.A.

(57) ABSTRACT

A method and a network device are provided to transmit network packets through a network security device. The method, performed by the network device, receives a request to send a network packet from a first computing device to a second computing device over a network that includes the network device and the network security device. The network packet includes a first network interface identifier for identifying the first computing device and a second network interface identifier for identifying the second computing device. The method identifies third and fourth network interface identifiers that cause the network packet to be transmitted through the network security device. The method transmits the network packet over the network through the network security device using the third and fourth network interface identifiers. The method transmits the network packet to the second computing device using the first and second network interface identifiers.

19 Claims, 8 Drawing Sheets

(56) References Cited

U.S. PATENT DOCUMENTS

| | | | |
|---|---|---|---|
| 6,119,236 A | 9/2000 | Shipley | |
| 6,240,513 B1 | 5/2001 | Friedman et al. | |
| 6,442,694 B1 | 8/2002 | Bergman et al. | |
| 6,898,632 B2 | 5/2005 | Gordy et al. | |
| 7,000,006 B1 | 2/2006 | Chen | |
| 7,095,716 B1 | 8/2006 | Ke et al. | |
| 7,610,375 B2 | 10/2009 | Portolani et al. | |
| 7,760,656 B1 | 7/2010 | Yuan et al. | |
| 7,849,506 B1 | 12/2010 | Dansey et al. | |
| 7,996,894 B1 | 8/2011 | Chen et al. | |
| 8,134,919 B2 | 3/2012 | Zeng et al. | |
| 8,640,221 B2 | 1/2014 | Litvin | |
| 2002/0035639 A1 | 3/2002 | Xu | |
| 2004/0030765 A1 | 2/2004 | Zilbershtein et al. | |
| 2005/0058132 A1 | 3/2005 | Okano et al. | |
| 2005/0147097 A1 | 7/2005 | Chari et al. | |
| 2005/0201273 A1 | 9/2005 | Shimizu | |
| 2005/0243712 A1* | 11/2005 | MacKinnon | H04L 1/22 370/216 |
| 2006/0077974 A1 | 4/2006 | Goossens et al. | |
| 2006/0077975 A1 | 4/2006 | Huang et al. | |
| 2006/0143440 A1 | 6/2006 | Ponnapalli et al. | |
| 2006/0193300 A1 | 8/2006 | Rawat et al. | |
| 2007/0086363 A1 | 4/2007 | Wakumoto et al. | |
| 2007/0157306 A1 | 7/2007 | Elrod et al. | |
| 2007/0217431 A1 | 9/2007 | Whitaker | |
| 2007/0248090 A1 | 10/2007 | Budhani et al. | |
| 2008/0049779 A1 | 2/2008 | Hopmann et al. | |
| 2008/0212579 A1 | 9/2008 | LaVigne et al. | |
| 2008/0225888 A1 | 9/2008 | Valluri et al. | |
| 2009/0003317 A1 | 1/2009 | Kasralikar et al. | |
| 2009/0019141 A1 | 1/2009 | Bush et al. | |
| 2009/0044270 A1 | 2/2009 | Shelly et al. | |
| 2009/0220080 A1 | 9/2009 | Herne et al. | |
| 2009/0249438 A1 | 10/2009 | Litvin et al. | |
| 2009/0249470 A1 | 10/2009 | Litvin et al. | |
| 2010/0235914 A1 | 9/2010 | Proulx | |
| 2010/0306816 A1 | 12/2010 | McGrew et al. | |
| 2012/0166582 A1* | 6/2012 | Binder | H04L 63/18 709/217 |
| 2014/0130146 A1 | 5/2014 | Litvin | |

OTHER PUBLICATIONS

Notification of Transmittal of International Preliminary Report on Patentability mailed May 8, 2012 in corresponding International Application No. PCT/US2010/059975, 7 pgs.

* cited by examiner

MEDIA ACCESS CONTROL ADDRESS TRANSLATION IN VIRTUALIZED ENVIRONMENTS

CLAIM OF BENEFIT TO PRIOR APPLICATIONS

This application is a continuation of U.S. application Ser. No. 14/152,088 filed Jan. 10, 2014, which is a continuation of U.S. application Ser. No. 12/965,802, filed on Dec. 10, 2010, now issued U.S. Pat. No. 8,640,221, which claims the benefit of U.S. Provisional Application 61/285,953, filed on Dec. 11, 2009, the entire content of each of which is incorporated herein by reference.

BACKGROUND

An intrusion prevention system (IPS) is a type of security device that protects against unwanted malicious network attacks and intrusions. Typically, an IPS monitors activity between networks and prevents the unwanted activity (e.g., by dropping packets) from occurring once the IPS detects it. A hardware IPS device may have a number of port pairs in which network traffic enters one port of a port pair and exits the other port of the port pair. That is, a port pair functions as an independent bridge between the devices that are connected to a port pair. These devices include routers, hubs, switches, and computers, among other like devices.

While hardware IPS devices may be effective network security devices, they are generally expensive. IPS port pairs are a scarce resource due to the high price of the hardware IPS and the low number of port pairs available. Hence, it is desirable to maximize the use of each port pair.

Similar to physical computer systems, virtual computer systems need protection against these unwanted behaviors. In particular, virtual computer systems need protection not only against intrusions that come from outside of the physical machine on which the virtual computer system is hosted, but also against intrusions that come from other virtual computer systems hosted on the same physical machine. Therefore, virtual computer systems may benefit from utilization of an IPS. In order to do so, network traffic to and from virtual computer systems need to pass through the IPS before reaching its destination.

However, there are problems implementing network security with an IPS in an environment of virtual computer systems that prevent the network traffic to be passed through the IPS before reaching its destination. These problems cause the network traffic to bypass the IPS, leaving virtual computer systems and their hosts vulnerable to malicious attacks and intrusions. Therefore, there is a desire for a mechanism that allows network traffic to and from virtual computer systems to pass through a hardware IPS device.

BRIEF SUMMARY

Some embodiments of the invention provide a method that transmits network packets through a network security device to monitor network traffic and/or system activities for malicious activity. Some embodiments are used in a network of virtual machines in which several virtual servers host virtual machines while other embodiments are used in a network that includes physical computing devices. Still, some embodiments are used in a network that includes both virtual machines and physical computing devices.

In some embodiments, the computing devices in a network each include one or more unique network interface identifiers that identify the computing devices for sending and receiving network traffic among each other. Some of these embodiments use media access control (MAC) addresses as network interface identifiers. For example, the method of some embodiments receives a request to send a network packet from a first computing device to a second computing device over a network that includes the network security device. The network packet includes a MAC address for identifying the first computing device on the network (e.g., source MAC address) and a MAC address for identifying the second computing device on the network (e.g., destination MAC address).

Some embodiments perform MAC network address translation (MAC-NAT) in order to route the network packet through the network security device. For example, a pair of MAC addresses is identified for the network packet and the network packet is translated so that the network packet is routed through the network security device. The MAC addresses are identified and the network packet's MAC addresses are translated using the identified MAC addresses in a manner that causes the network packet to be routed through the network security device when it is transmitted over the network. For instance, the pair of MAC addresses is identified so that, from the perspective of the network security device, a different network is "presented" on each side of the network security device, causing the network packet to be routed through the network security device. The network packet's original MAC addresses (e.g., source MAC and destination MAC addresses) are translated using the identified pair of MAC addresses. The translated network packet is transmitted over the network through the network security device. The network packet is then translated back to its original MAC addresses and transmitted over the network to the second computing. In some embodiments, the network packet avoids the network security device when it is transmitted over the network using its original MAC addresses.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method that transmits network packets through a network security device to monitor network traffic and/or system activities for malicious activity. Some embodiments are used in a network of virtual machines in which several virtual servers host virtual machines while other embodiments are used in a network that includes physical computing devices. Still, some embodiments are used in a network that includes both virtual machines and physical computing devices.

In some embodiments, the computing devices in a network each include one or more unique network interface identifiers that identify the computing devices for sending and receiving network traffic among each other. Some of these embodiments use media access control (MAC) addresses as network interface identifiers. For example, the method of some embodiments receives a request to send a network packet from a first computing device to a second computing device over a network that includes the network security device. The network packet includes a MAC address for identifying the first computing device on the network (e.g., source MAC address) and a MAC address for identifying the second computing device on the network (e.g., destination MAC address).

Some embodiments perform MAC network address translation (MAC-NAT) in order to route the network packet through the network security device. For example, a pair of MAC addresses is identified for the network packet and the network packet is translated so that the network packet is routed through the network security device. The MAC addresses are identified and the network packet's MAC addresses are translated using the identified MAC addresses in a manner that causes the network packet to be routed through the network security device when it is transmitted over the network. For instance, the pair of MAC addresses is identified so that, from the perspective of the network security device, a different network is "presented" on each side of the network security device, causing the network packet to be routed through the network security device. The network packet's original MAC addresses (e.g., source MAC and destination MAC addresses) are translated using the identified pair of MAC addresses. The translated network packet is transmitted over the network through the network security device. The network packet is then translated back to its original MAC addresses and transmitted over the network to the second computing. In some embodiments, the network packet avoids the network security device when it is transmitted over the network using its original MAC addresses.

Several more detailed embodiments of the invention are described in the sections below. Section I provides a conceptual description of an example system configuration of some embodiments. Next, Section II describes different methods for routing network packets through a network security device using media access control network address translation (MAC-NAT). Finally, Section III describes a computer system that implements some embodiments of the invention.

I. Intrusion Prevention System (IPS)

In some embodiments, it is desirable to pass network traffic through a physical hardware intrusion prevention system (IPS) device. That is, it is desirable to pass packets coming to/from a computing device (e.g., a protected virtual machine (VM)) over the network through a hardware IPS device. If the hardware IPS device allows a network packet to pass, it sends the packet to their original destination. On the other hand, if the hardware IPS device does not allow a packet to pass, it drops the packet.

The hardware IPS device of some embodiments is a layer 2 device that does not support any layer 3 tunneling protocols. In general, packets entering one side of the IPS is either allowed to pass through to the other side or not allowed to pass through (e.g., by dropping the packets). In some embodiments, a hardware IPS device includes several port pairs where each port pair functions as an independent bridge between the corresponding port pair. Port pairs may be a scarce resource because the hardware IPS device price to number of port pairs ratio is high.

With the objective of maximizing the use of a hardware IPS device, several computing devices (e.g., VM servers) share the same port pair of the hardware IPS device in some embodiments. In addition, it may be desirable to minimize the extra configuration needed to support sharing the same port pair of the hardware IPS device. For example, it may be desirable to minimize the use of additional network interfaces on the computing devices (e.g., VM servers).

Figure 1:
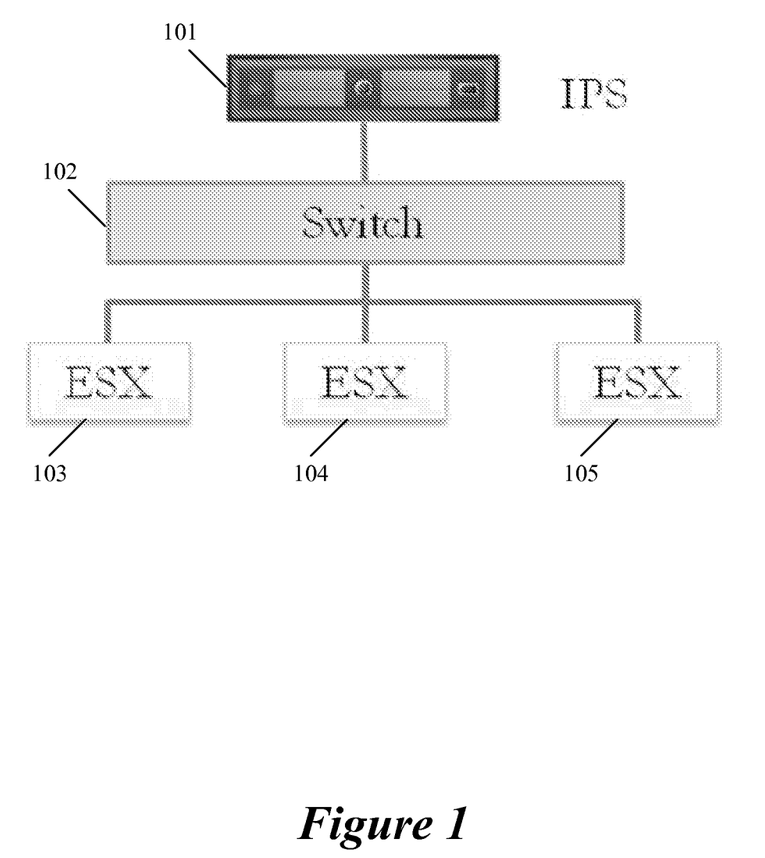
FIG. 1 illustrates an example system configuration of some embodiments.

A source of complication may exist in some embodiments where several security devices located on different computing devices (e.g., VM servers) share the same port pair on a hardware IPS device. FIG. 1 illustrates a system configuration of some embodiments that includes several VM servers sharing the same port pair of a hardware IPS device. As shown, the system of FIG. 1 includes IPS 101, switch 102, and VM servers 103-105. VMware ESX servers are shown throughout this application as VM servers for exemplary purposes. However, other types of VM servers may be used as well.

Figure 2:
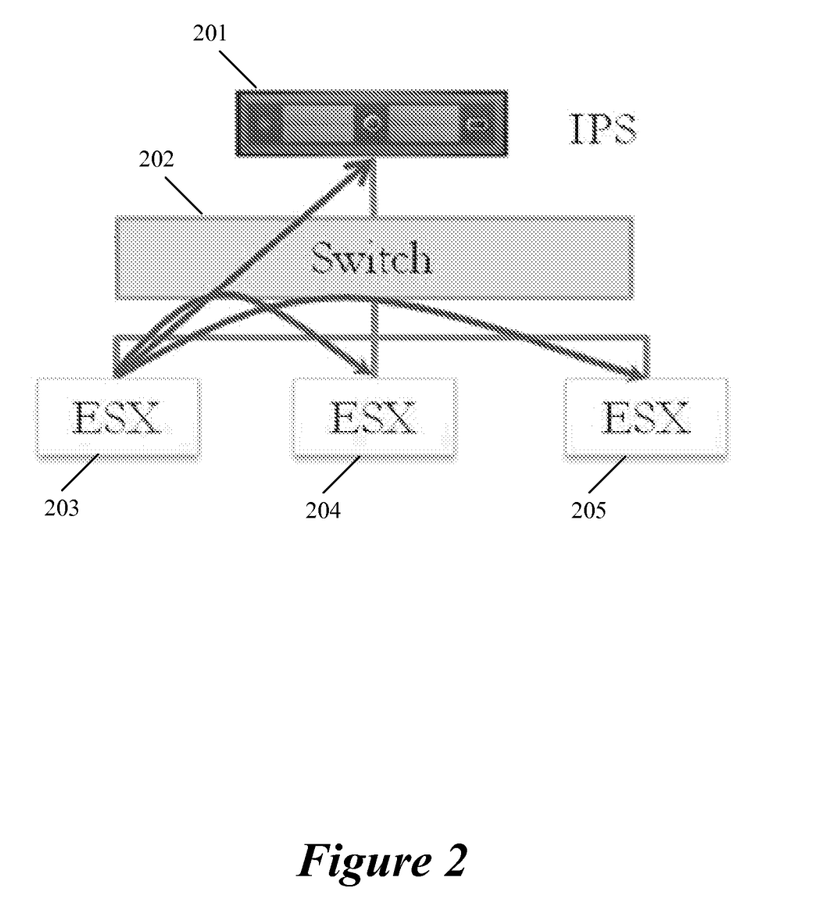
FIG. 2 illustrates an example flooding of the system configuration of FIG. 1 according to some embodiments of the invention.

A problem of the system configuration shown in FIG. 1 is flooding. When a switch receives a packet, if the switch has not learned the destination media access control (MAC) address, the switch floods the packets by sending the packet to all the devices connected to the switch. FIG. 2 illustrates flooding in the system configuration of FIG. 1. Here, switch 202 has not learned the destination MAC address of a packet sent from VM server 203. Thus, when switch 202 receives the packet from VM server 203, switch 202 sends the packet to all the other devices connected to switch 202, which are IPS 201, VM server 204, and VM server 205. A problem with flooding is that it creates excessive load on all the VM servers and network connections that receive the network traffic. As the number of VM servers in a system configuration increases, the load on each individual VM server also increases. Thus, the system is not scalable.

Figure 3:
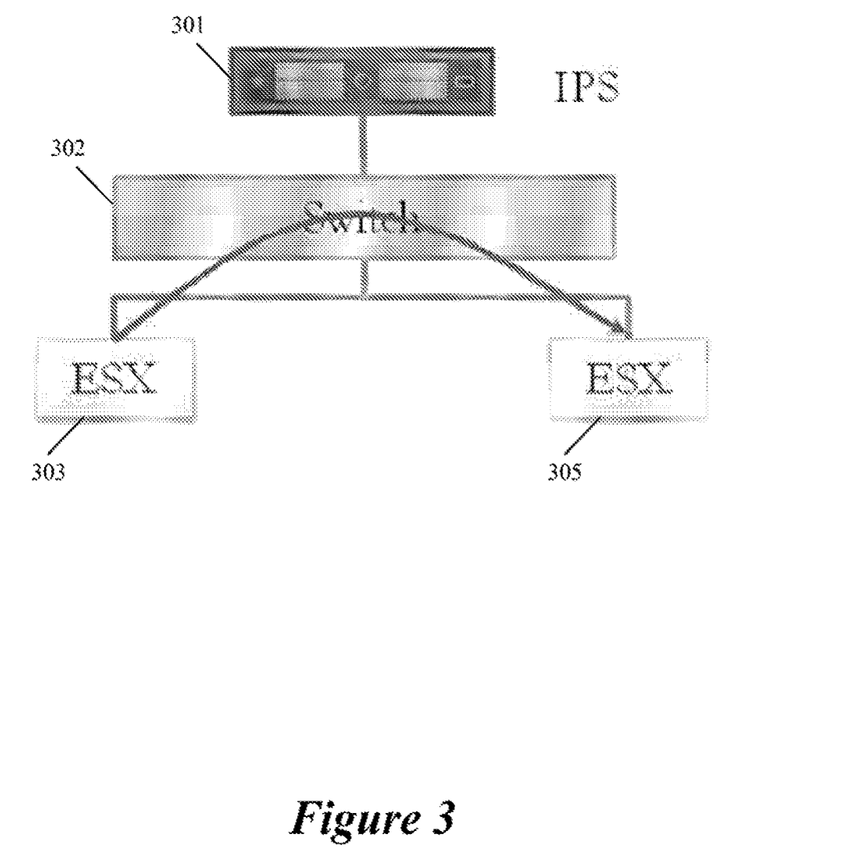
FIG. 3 illustrates a switch not passing packets through an intrusion prevention system (IPS) device in the system configuration of FIG. 1 according to some embodiments of the invention.

Another problem with the system configuration of FIG. 1 is that a packet may not pass through the hardware IPS device. For example, if a switch learns that two MAC addresses are on the same side of the switch, the switch diverts packets sent from one of MAC addresses to the other MAC address without passing the packets through the hardware IPS device. FIG. 3 illustrates the switch not passing packets through the IPS in the system configuration of FIG. 1. Here, switch 302 has learned the MAC addresses of VM server 303 and VM server 305, which are located on the same side of switch 302. Therefore, when VM server 303 sends a packet to VM server 305, switch 302 passes the packet directly to VM server 305 without passing the packet through IPS 301.

Another problem exists when the switch determines that a packet has to go out through the same switch port in which it arrived. In that case the switch drops the packet.

In some embodiments, a solution to the problems discussed above is to present to the IPS and/or switch the picture that the IPS and/or switch expect. That is, each machine is located on each side of the IPS and/or switch instead of being located on the same side of the IPS and/or switch. For example, an IPS and/or switch expect each machine to be located at a specific location relative to the IPS and/or switch (e.g., "north" or "south"). So in cases where all machines are physically located on the same "side" of the IPS and/or switch, a logical picture is presented to the IPS and/or switch such that each and every connection is between the machines that are physically located on the same "side" of the IPS and/or switch are on opposite sides of the IPS and/or switch.

The solution can be accomplished by maintaining two shadows of a VM in order to place each VM on different sides of the hardware IPS device. That is, for each connection between VMs, the connection is presented to the hardware IPS device as a connection between shadows that are on opposite sides of the hardware IPS device.

II. MAC-NAT

As discussed above, two shadows (e.g., a red shadow and a blue shadow) are maintained for each VM in some embodiments. For purposes of explanation, the two sides of the hardware IPS device and/or switch are called the red network and the blue network respectively. Accordingly, the red shadows are only seen on the red network and blue shadows are only seen from the blue network.

Figure 4:
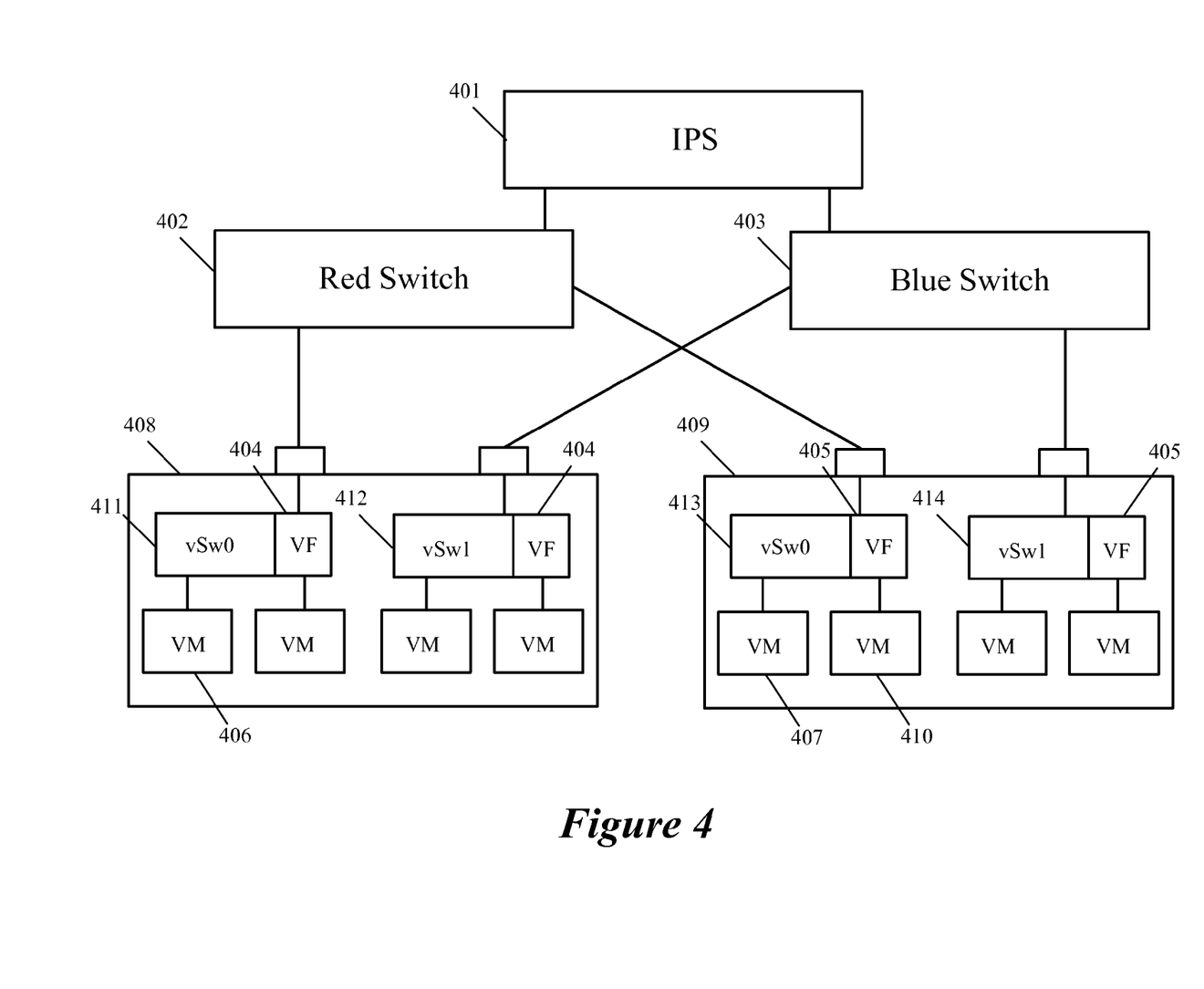
FIG. 4 illustrates a dual switch system configuration of some embodiments.

In some embodiments, a system configuration includes two switches. FIG. 4 illustrates a dual switch system configuration of some embodiments. As shown, FIG. 4 includes IPS 401, red switch 402, blue switch 403, and VM servers 408 and 409. VM server 408 includes virtual firewall (VF) 404, includes virtual switch (VS) 411 and VS 412, and hosts various VMs including VM 406. Likewise, VM server 409 includes VF 405, includes VS 413 and VS 414, and hosts various VMs including VM 407 and VM 410. In some embodiments, a virtual switch functions like the switches described above. In some embodiments, IPS 401 is a hardware IPS device as described above, and red switch 402 and blue switch 403 are switches that learn MAC addresses as described above.

When a connection from one VM to another VM is detected (e.g., VM 406 to VM 407), some embodiments arbitrarily determine the connection to be presented between the two VMs (e.g., VM 406 (red) and VM 407 (blue)). For instance, for each packet transmitted through a connection from VM 406 to VM 407, some of these embodiments determine that each packet is sent through the IPS from VM 406 (red) to VM 407 (blue). Similarly, for each packet transmitted through the connection from VM407 to VM406, the packet is sent through the IPS from VM 407 (blue) to VM 406 (red). As another example, if there is a connection from VM 407 to VM 410, some embodiments arbitrarily determine to present a connection from VM 407 (red) to VM 410 (blue).

In some embodiments, a method of implementing the shadows is through MAC network address translation (NAT) or MAC-NAT. As discussed above, switches identify where to route network packets based on the MAC address included in the network packets. In order to create two shadows that look distinct to the switch, MAC addresses of network packets are changed (or translated). Thus, in addition to its original MAC address, each VM machine has two additional MAC addresses allocated for it, one corresponding to the red network and one corresponding to the blue network. A decision is made as to which MAC addresses in a packet are translated, and in which direction of the hardware IPS device the packet is sent.

a. Double Pass-Through

The following is a description of an implementation of MAC-NAT in a dual switch system configuration of some embodiments. For purposes of explanation, the system configuration illustrated in FIG. 4 is used as an example. In this embodiment, packets pass through a hardware IPS device twice. In addition, each VM server in this example has two dedicated interfaces with one for each side of the hardware IPS device.

The VF of each VM server maintains two MAC addresses (one for the red network and one for the blue network) for each VM that it hosts. The MAC addresses are unique to the corresponding VF and are not shared and do not overlap with MAC addresses of VMs on other VM servers. When a packet from VM 406 to VM 407 needs to be sent through IPS 401, VF 404 passes the packet through VF 404's reject/accept security policy to make sure that it passes. Then, VF 404 decides if it flows from the red network to the blue network or vice versa. In some embodiments, the decision is made based on which VM made the request. For example, a packet going from client to server is sent from the red network to the blue network and a packet going from server to client is sent from the blue network to the red network. In some embodiments, the decision is based on an arbitrary canonical order of the protected VMs. For example, the decision may be made based on a unique ID used to identify a VM where the VM with the lower ID is assigned a MAC address on the red network and the other VM is assigned a MAC address on the blue network.

Once a side is chosen, the VF changes (e.g., translates) the MAC addresses of the packet so that, for example, the source MAC address is one that belongs to the red network and the destination MAC address is one that belongs to blue network. Then, the packet is sent over the network to red switch 402.

When a VF of a VM server receives a packet from the blue (or the red) network, it will check to see if the destination MAC address is a MAC address that the VM owns and also a MAC address that belongs to the blue (or the red) network. If it is not, the VF drops the packet. Otherwise, the VF internally marks that it went through IPS 401, translates the MAC addresses back to their original MAC addresses, and passes the packet through the security policy of the destination VM. In some embodiments, even if the security policy of the destination VM requires IPS 401 to check the packet, the packet does not have to be sent back through IPS 401 since it was already sent through IPS 401.

The following is a more detailed description of the packet flow of this embodiment. As an example, the packet flow of a packet sent from VM 406 on VM server 408 to VM 407 on VM server 409 is described. VF 404 processes the packet and discovers that the packet needs to be sent through IPS 401. VF 404 translates the packet so that the source MAC address is one that belongs to VM server 408 for the red network and the destination MAC address is one that belongs to VM server 408 for the blue network. Then, the packet is sent over the network to red switch 402. Red switch 402 learns about the source MAC address that belongs to VM server 408 for the red network, but since red switch 402 does not know anything about the destination MAC address that belongs to VM server 408 for the blue network, red switch 402 floods the packet. All the other VM servers connected to red switch 402 (i.e., VM server 409) receive the packet. Since the destination MAC address that belongs to VM server 408 for the blue network is not a MAC address belonging to the red network, VM server 409 drops the packet.

As part of the flooding, the packet is also sent over the network through IPS 401 to blue switch 403. Blue switch 403 learns about the source MAC address that belongs to VM server 408 for the red network and floods the packets to all the other VM servers (i.e., VM server 408 and VM server 409). VF 405 drops the packet because the destination MAC address that belongs to VM server 408 for the blue network does not belong to VM server 409. VF 404 receives the packet. Since the destination MAC address belongs to VM server 408 for the blue network, VF 404 translates the packet back to the original MAC addresses and passes the packet to VM 407 through the regular network.

The packet arrives at VF 405. VF 405 translates the packet so that the source MAC address is one that belongs to VM server 409 for the red network and the destination MAC address is one that belongs to VM server 409 for the blue network. Then, the packet is sent over the network to red switch 402. Flooding and learning happens as described above with red switch 402 and blue switch 403 and the packet comes back to VF 405. Then, VF 405 passes the packet to VM 407.

Next, the packet flow of a packet sent in response to the above packet from VM 407 on VM server 409 to VM 406 on VM server 408 is described. VF 405 translates the packet so that the source MAC address is the MAC address belonging to VM 409 that was previously used for the blue network, above. The destination MAC address is the MAC address belonging to VM 409 that was previously used for the red network. Then, the packet is sent over the network to blue switch 403. Blue switch 403 learns the source address. Since blue switch 403 already learned about the destination MAC address, blue switch 403 sends the packet over the network only to IPS 401. IPS 401 passes the packet to red switch 402. Like blue switch 403, red switch 402 learns about the source MAC address and sends the packet only to VM server 409 since red switch already learned about the destination MAC address. VF 405 receives the packet, translates the packet back to the original MAC addresses, and sends the packet to VM 406 through the regular network. The packet arrives at VM server 408 where it is processed against similar security policies.

When VM 406 sends another packet to VM 407, the packet flow behaves like before but without the flooding since red switch 402 and blue switch 403 has already learned of the MAC addresses.

Figure 5:
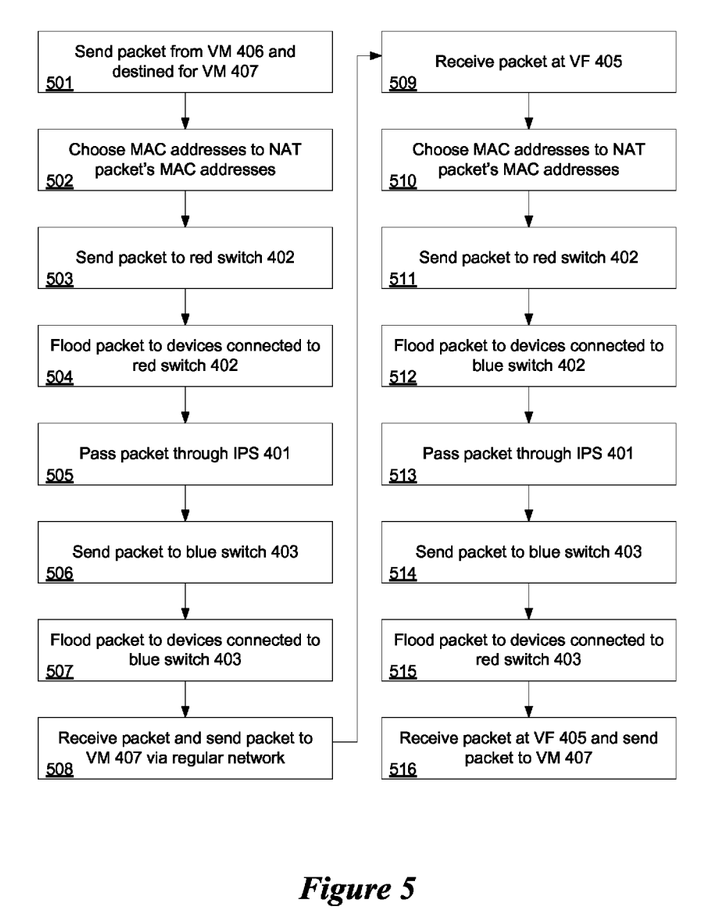
FIG. 5 illustrates a flow chart of an example packet flow of the system of FIG. 4 according to some embodiments of the invention.

FIG. 5 illustrates a flow chart of an example packet flow of the system of FIG. 4 of some embodiments. In particular, FIG. 5 shows a flow chart of the packet flow between VM 406 and VM 407 as described above. As shown, a packet is sent (at step 501) from VM 406 and is destined for VM 407. Next, VF 404 chooses (at step 502) appropriate MAC addresses to perform MAC-NAT on the packet's source and destination MAC addresses so that the packet is send from VM 406 through the red network back to VM 406 through the blue network and thus through IPS 401. The packet is sent (at step 503) over the network to red switch 402. Since red switch 402 has not learned the MAC addresses of the packet, red switch 402 floods (at step 504) the packet. IPS 401 receives (at step 505) the flooded packet and passes it through IPS 401. Next, the packet is sent (at step 506) over the network to blue switch 403. Like red switch 402, blue switch 403 has not learned the MAC addresses of the packet. Therefore, blue switch floods (at step 507) the packet. VF 404 receives (at step 508) the packet and sends it to VM 407 through the regular network.

The packet is received (at step 509) at VF 405. Based on the security policies of VF 405, the packet is required to pass through IPS 401 again. Thus, VF 405 chooses (at step 510) appropriate MAC addresses to NAT the packet's MAC addresses to perform MAC-NAT on the packet's source and destination MAC addresses so that the packet is send from VM 407 through the red network back to VM 407 through the blue network and thus through IPS 401. The packet is sent (at step 511) over the network to red switch 402. Since red switch 402 has not learned the MAC addresses of the packet, red switch 402 floods (at step 512) the packet. IPS 401 receives (at step 513) the flooded packet and passes it through IPS 401. Next, the packet is sent (at step 514) over the network to blue switch 403. Blue switch 403 has not learned the MAC addresses of the packet so blue switch floods (at step 515) the packet. Finally, VF 405 receives (at step 516) the packet and sends it to VM 407.

The above discussion of the dual pass-through packet flow of a packet sent from VM 406 to VM 407 is merely an example of the behaviors of packets in the system of FIG. 4. Accordingly, packets sent from any VM to any other VM in the system of FIG. 4 behaves the same or similar to the packet flow described above.

In some embodiments of the embodiments described above, broadcasting and multicasting do not behave differently than one another. MAC addresses are allocated for broadcast and/or multicast. For instance, a single pair of red and blue MAC broadcast/multicast addresses is allocated for each VM server in some embodiments. Further, the appropriate MAC addresses are reconstructed based on the IP addresses. Note that each of these packets may pass through the hardware IPS device. Thus, a packet passes through the hardware IPS device for each participating VM.

b. Single Pass-Through

The following is a description of another implementation of MAC-NAT in a dual switch system configuration of some embodiments. For purposes of explanation, FIG. 4 is used as an example. In this embodiment, packets pass through the hardware IPS device once. However, it allows traffic flowing between protected VMs to be passed through the hardware IPS device. In addition, each VM server in this example has two dedicated network interfaces with one for each side of the hardware IPS device.

In this embodiment, a VF controller or center (not shown) maintains two MAC addresses for each protected VM (one for the red network and one for the blue network). Therefore, each VM server knows all the MAC addresses of the other VM servers by virtue of the VF controller.

When a packet from VM 406 to VM 407 needs to be sent through IPS 401, VF 404 passes the packet through VF 404's reject/accept security policy to make sure that it passes. Then, VF 404 decides if it flows from the red network to the blue network or vice versa. In some embodiments, the decision is made based on which VM made the request. For example, a packet going from client to server is sent from the red network to the blue network and a packet going from server to client is sent from the blue network to the red network. In some embodiments, the decision is based on an arbitrary canonical order of the protected VMs. For example, the decision may be made based on the ID of a VM where the VM with the lower ID is assigned a MAC address on the red network and the other VM is assigned a MAC address on the blue network.

Once a side is chosen, the VF changes the MAC addresses of the packet so that the source MAC address is one that belongs to the red network and the destination MAC address is one that belongs to blue network. Then, the packet is sent over the network to red switch 402. When a VF receives a packet from the blue (or the red) network, it will check to see if the destination MAC address is a MAC address that it owns and also a MAC address that belongs to the blue network. If it is not, the VF drops the packet. Otherwise, the VF internally marks that it went through IPS 401, translates the MAC addresses back to their original forms, and passes the packet through the security policy of the destination VM. In some embodiments, even if the security policy of the destination VM requires IPS 401 to check the packet, the packet does not have to be sent back through IPS 401 since it was already sent through IPS 401.

The following is a more detailed description of the packet flow of this embodiment. As an example, the packet flow of a packet sent from VM 406 on VM server 408 to VM 407 on VM server 409 is described. VF 404 processes the packet and discovers that the packet needs to be sent through IPS 401. VF 404 translates the packet so that the source MAC address is one that belongs to VM server 408 for the red network and the destination MAC address is one that belongs to VM server 409 for the blue network. Then, the packet is sent over the network to red switch 402. Red switch 402 learns about the source MAC address that belongs to VM server 408 for the red network, but since red switch 402 does not know anything about the destination MAC address that belongs to VM server 409 for the blue network, red switch 402 floods the packet. All the other VM servers connected to red switch 402 (i.e., VM server 409) receive the packet. Since the destination MAC address that belongs to VM server 409 for the blue network is not a MAC address belonging to the red network, VM server 409 drops the packet.

As part of the flooding, the packet is sent over the network through IPS 401 to blue switch 403. Blue switch 403 learns about the source MAC address that belongs to VM server 408 for the red network and floods the packets to all the other VM servers (i.e., VM server 408 and VM server 409). VF 404 drops the packet because the destination MAC address that belongs to VM server 409 for the blue network does not belong to VM server 408. VF 405 receives the packet because the destination MAC address belongs to VM server 409. VF 405 translates the packet back to the original MAC addresses and passes the packet to VM 407.

Next, the packet flow of a packet sent in response to the above packet from VM 407 on VM server 409 to VM 406 on VM server 408 is described. VF 405 translates the packet so that the source MAC address is the MAC address belonging to VM server 409 that was previously used for the blue network. The destination MAC address is the MAC address belonging to VM server 408 that was previously used for the blue network. Then, the packet is sent over the network to blue switch 403. Blue switch 403 learns the source MAC address. Since blue switch 403 already learned about the destination MAC address, blue switch 403 sends the packet only to IPS 401. IPS 401 passes the packet to red switch 402. Like blue switch 403, red switch 402 learns about the source MAC address and sends the packet only to VM server 408 since red switch 402 already learned about the destination MAC address. VF 404 receives the packet, translates the packet back to the original MAC addresses, and sends it to VM 406.

When VM 406 sends another packet to VM 407, the packet flow behaves like before but without the flooding since red switch 402 and blue switch 403 has already learned of the MAC addresses.

Figure 6:
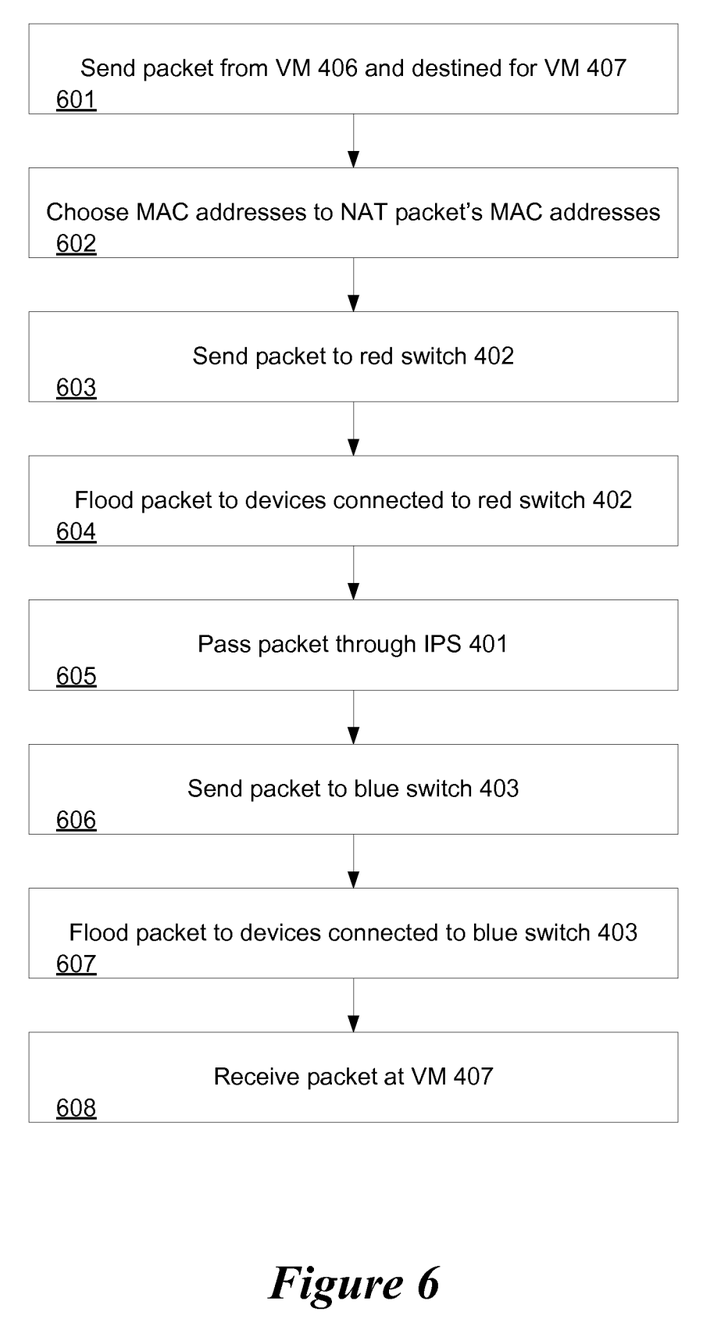
FIG. 6 illustrates a flow chart of an example packet flow of the system of FIG. 4 according to some embodiments of the invention.

FIG. 6 illustrates a flow chart of an example packet flow of the system of FIG. 4 of some embodiments. In particular, FIG. 6 shows a flow chart of the packet flow between VM 406 and VM 407 as described above. As shown, a packet is sent (at step 601) over the network from VM 406 and is destined to VM 407. Next, VF 404 chooses (at step 602) appropriate MAC addresses to perform MAC-NAT on the packet's source and destination MAC addresses so that the packet is send from VM 406 through the red network to VM 407 through the blue network and thus through IPS 401. The packet is sent (at step 603) over the network to red switch 402. Since red switch 402 has not learned the MAC addresses of the packet, red switch 402 floods (at step 604) the packet. IPS 401 receives (at step 605) the flooded packet and passes it through IPS 401. Next, the packet is sent (at step 606) over the network to blue switch 403. Like red switch 402, blue switch 403 has not learned the MAC addresses of the packet. Therefore, blue switch floods (at step 607) the packet. Finally, VF 405 receives (at step 608) the packet and sends it to VM 407.

The above discussion of the single pass-through packet flow of a packet sent from VM 406 to VM 407 is merely an example of the behaviors of packets in the system of FIG. 4. Accordingly, packets sent from any VM to any other VM in the system of FIG. 4 behaves the same or similar to the packet flow described above.

In some embodiments, broadcasting and multicasting packets so that they traverse through the hardware IPS device only once is difficult to accomplish. Therefore, the dual pass method described above may be used for broadcast and multicast.

In some embodiments, two kinds of unprotected machines are external machines and unprotected VMs. For external machines, traffic passing between virtual and the physical world can still pass through a hardware IPS device. However, unprotected VMs may be a problem because the physical network cannot be relied on to pass the traffic through the hardware IPS device. Therefore, some embodiments use the dual pass-through method described above, but accurate and up to date information about the VMs is needed in order for the method to function correctly.

c. Physical Environment

Figure 7:
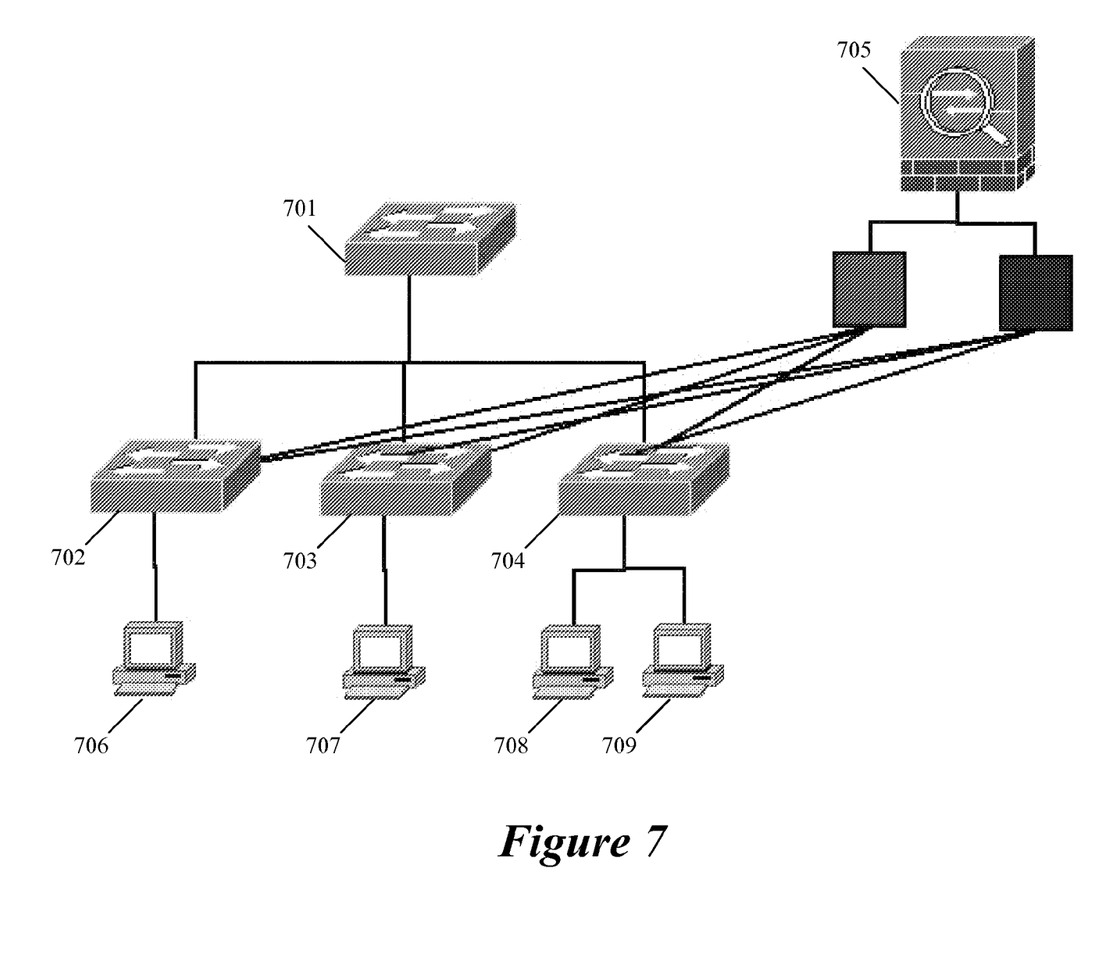
FIG. 7 illustrates a physical network system configuration of some embodiments.

The single pass-through and dual pass-through embodiments described above pertain to virtual environments with virtual switches and virtual machines. However, MAC-NAT can also be used in a physical environment. For example, MAC-NAT can be used in any environment that includes a flat layer 2 network and one or more cooperating security devices (e.g., a switch, bridge, etc.) FIG. 7 illustrates a physical network system configuration of some embodiments where MAC-NAT may be used.

As shown, the system configuration of FIG. 7 includes physical switches 701-704, central management device 705, and physical machines 706-709. In some embodiments, physical switches 701-704 function the same or similar to switches 402 and 403 of FIG. 4 as described above. In some embodiments, switches 701-704 each includes a firewall that functions the same or similar to VFs 404 and 405 as described above. In some embodiments, physical machines 706-709 function the same or similar to VMs 406, 407, and 410 of FIG. 4 as described above. That is, physical machines 706-709 are protected machines.

In some embodiments where the dual pass-through method described above is utilized, the firewall in each of physical switches 702-704 maintains its own database of MAC addresses that are allocated to the physical machines that are connected to it. The MAC addresses maintained by each firewall are unique and are not the same as the MAC addresses maintained by any other firewall. This allows each firewall to maintain two other MAC addresses for each physical machine connected to it (one for the red network and one for the blue network).

In some embodiments where the single pass-through method described above is utilized, central management device 705 functions the same or similar to the VF controller (or center) described above. That is, central management device 705 maintains a global database of MAC addresses for the physical machines (e.g., physical machines 706-709) connected to all the switches (e.g., physical switches 702-704). This allows central management device 705 to maintain two other MAC addresses for each physical machine (one for the red network and one for the blue network).

The various examples and embodiments described above illustrate system configurations that include only virtual machines or only physical computers. However, one of ordinary skill in the art will realize that these system configurations can include both virtual machines and physical computers as well as other types of virtual and non-virtual computing devices (e.g., smartphones, tablet devices, laptop computers, etc.) that are connected to the network.

In addition, the sections above describe different techniques for routing network traffic through an IPS of a system configuration of some embodiments. However, one of ordinary skill will recognize that such techniques can be employed to route networking traffic over the network through any other network security device (e.g., an intrusion detection system (IDS) device, a firewall device, an anti-virus device) that would otherwise not pass through such network device. Moreover, while the network security devices described in the previous sections are hardware devices, the network security devices can be software devices in some embodiments.

III. Computer System

Figure 8:
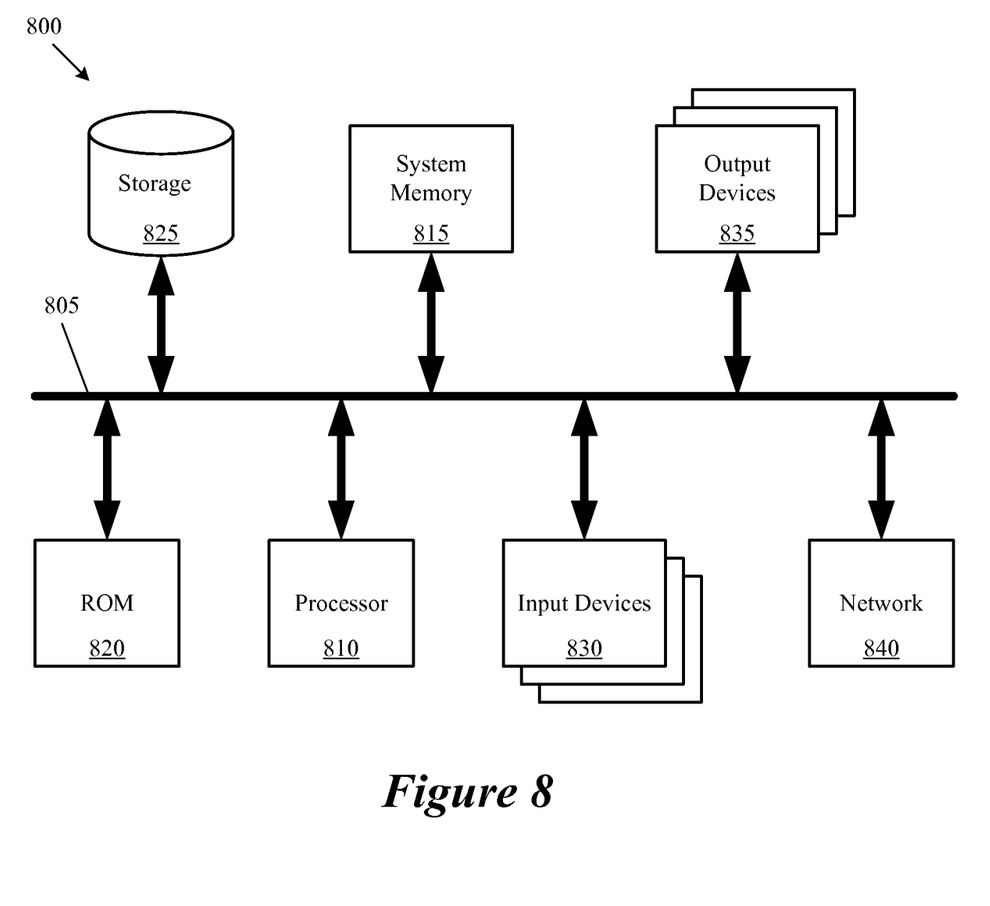
FIG. 8 illustrates a computer system with which some embodiments are implemented.

FIG. 8 illustrates a computer system 800 with which some embodiments are implemented. Such a computer system includes various types of computer readable mediums and interfaces for various other types of computer readable mediums. Computer system 800 includes a bus 805, a processor 810, a system memory 815, a read-only memory (ROM) 820, a permanent storage device 825, input devices 830, and output devices 835. The components of the computer system 800 are electronic devices that automatically perform operations based on digital and/or analog input signals.

One of ordinary skill in the art will recognize that the computer system 800 may be embodied in other specific forms without deviating from the spirit of the invention. For instance, the computer system may be implemented using various specific devices either alone or in combination. For example, a cellular phone may include the input and output devices 830 and 835, while a remote personal computer ("PC") may include the other devices 805-825, with the cellular phone connected to the PC through a cellular network that accesses the PC through its network connection 840.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the invention. In some cases, the bus 805 may include wireless and/or optical communication pathways in addition to or in place of wired connections. For example, the input and/or output devices may be coupled to the system using a wireless local area network (W-LAN) connection, Bluetooth®, or some other wireless connection protocol or system.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments use a mass-storage device (such as a magnetic or optical disk and its corresponding disk drive) as the permanent storage device 825.

Other embodiments use a removable storage device (such as a floppy disk, flash drive, or CD-ROM) as the permanent storage device. Like the permanent storage device 825, the system memory 815 is a read-and-write memory device. However, unlike storage device 825, the system memory is a volatile read-and-write memory, such as a random access memory (RAM). The system memory stores some of the instructions and data that the processor needs at runtime. In some embodiments, the sets of instructions used to implement invention's processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keyboards and pointing devices (also called "cursor control devices"). The input devices 830 also include audio input devices (e.g., microphones, MIDI musical instruments, etc.) and video input devices (e.g., video cameras, still cameras, optical scanning devices, etc.). The output devices 835 include printers, electronic display devices that display still or moving images, and electronic audio devices that play audio generated by the computer system. For instance, these display devices may display a graphical user interface (GUI). The display devices include devices such as cathode ray tubes (CRT), liquid crystal displays (LCD), plasma display panels (PDP), surface-conduction electron-emitter displays (SED), etc. The audio devices include a PC's sound card and speakers, a speaker on a cellular phone, a Bluetooth® earpiece, etc. Some or all of these output devices may be wirelessly or optically connected to the computer system 800.

Finally, as shown in FIG. 8, bus 805 also couples computer 800 to a network 840 through a network adapter (not shown). In this manner, the computer can be a part of a network of computers (such as a local area network ("LAN"), a wide area network ("WAN"), or an Intranet, or a network of networks, such as the Internet. For example, the computer 800 may be coupled to a web server (network 840) so that a web browser executing on the computer 800 can interact with the web server as a user interacts with a GUI that operates in the web browser.

As mentioned above, the computer system 800 may include one or more of a variety of different computer-readable media (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by at least one processor and includes sets of instructions for performing various operations.

For the purposes of this Specification, a computer is a machine and the terms display or displaying mean displaying on an electronic device. It should be recognized by one of ordinary skill in the art that any or all of the components of computer system 800 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms (i.e., different embodiments may implement or perform different operations) without departing from the spirit of the invention. In addition, several examples discuss accessing the system using a cellular phone or mobile device, but one of ordinary skill will recognize that a user could access the system using a PC, PDA, smartphone, BlackBerry®, or other device.

I claim:

1. A method for transmitting network packets through a network security device, the method comprising:
    receiving, by a first virtual firewall (VF) of a first network device, a network packet from a first virtual machine (VM) hosted by the first network device to be sent over a network to a second VM hosted by a second network device, wherein the network comprises the network security device, a first network switch on a first side of the network security device, and a second network switch on a second side of the network security device, and wherein the network packet comprises a first medium access control (MAC) address identifying the first VM and a second MAC address identifying the second VM;
    translating, by the first VF, the first MAC address of the network packet to a third MAC address for the first VM hosted by the first network device, wherein the third MAC address belongs to a first network interface connected to the first network switch on the first side of the network security device;
    translating, by the first VF, the second MAC address of the network packet to a fourth MAC address for the second VM hosted by the second network device, wherein the fourth MAC address belongs to a second network interface connected to the second network switch on the second side of the network security device; and
    transmitting the network packet from the first VF of the first network device over the network through the first network switch, the network security device, and the second network switch to a second VF of the second network device hosting the second VM based on the third MAC address and the fourth MAC address.

2. The method of claim 1, further comprising requesting, by the first VF and from a VF controller in the network, the third MAC address that belongs to the first network interface connected to the first network switch on the first side of the network security device for the first VM hosted by the first network device, and the fourth MAC address that belongs to the second network interface connected to the second network switch on the second side of the network security device for the second VM hosted by the second network device, wherein the VF controller maintains one MAC address belonging to the first side of the network security device and another MAC address belonging to the second side of the network security device for each VM in the network.

3. The method of claim 1, wherein the first MAC address identifying the first VM comprises a source address of the network packet, and wherein the second MAC address identifying the second VM comprises a destination address of the network packet.

4. The method of claim 1, wherein the first MAC address identifying the first VM belongs to the first network interface and the second MAC address identifying the second VM belongs to a third network interface, both belonging to the first side of the network security device, and wherein the network packet bypasses the network security device when the network packet is transmitted from the first VM hosted by the first network device to the second VM hosted by the second network device based on the first MAC address and the second MAC address.

5. The method of claim 1, wherein the network security device comprises an intrusion prevention system (IPS) device.

6. The method of claim 1, wherein the first network device comprises a first server having the first VF and hosting the first VM, and wherein the second network device comprises a second server having the second VF and hosting the second VM.

7. A network device for transmitting network packets through a network security device, the network device comprising:
    a memory; and
    at least one processor in communication with the memory and configured to:
        host a first virtual machine (VM); and
        execute a first virtual firewall (VF), the first VF configured to:
            receive a network packet from the first VM to be sent over a network to a second VM hosted by another network device, wherein the network comprises the network security device, a first network switch on a first side of the network security device, and a second network switch on a second side of the network security device, and wherein the network packet comprises a first medium access control (MAC) address identifying the first VM and a second MAC address identifying the second VM,
            translate the first MAC address of the network packet to a third MAC address for the first VM hosted by the network device, wherein the third MAC address belongs to a first network interface connected to the first network switch on the first side of the network security device,
            translate the second MAC address of the network packet to a fourth MAC address for the second VM hosted by the another network device, wherein the fourth MAC address belongs to a second network interface connected to the second network switch on the second side of the network security device, and
            transmit the network packet over the network through the first network switch, the network security device, and the second network switch to a second VF of the another network device hosting the second VM based on the third MAC address and the fourth MAC address.

8. The network device of claim 7, wherein the first VF is configured to request, from a VF controller in the network, the third MAC address that belongs to the first network interface connected to the first network switch on the first side of the network security device for the first VM hosted by the network device, and the fourth MAC address that belongs to the second network interface connected to the second network switch on the second side of the network security device for the second VM hosted by the another network device, wherein the VF controller maintains one MAC address belonging to the first side of the network security device and another MAC address belonging to the second side of the network security device for each VM in the network.

9. The network device of claim 7, wherein the first MAC address identifying the first VM comprises a source address of the network packet, and wherein the second MAC address identifying the second VM comprises a destination address of the network packet.

10. The network device of claim 7, wherein the first MAC address identifying the first VM belongs to the first network interface and the second MAC address identifying the second VM belongs to a third network interface, both belonging to the first side of the network security device, and wherein the network packet bypasses the network security device when the network packet is transmitted from the first VM hosted by the network device to the second VM hosted by the another network device based on the first MAC address and the second MAC address.

11. The network device of claim 7, wherein the network security device comprises an intrusion prevention system (IPS) device.

12. The network device of claim 6, wherein the network device comprises a first server executing the first VF and hosting the first VM, and wherein the another network device comprises a second server executing the second VF and hosting the second VM.

13. A system for transmitting network packets through a network security device, the system comprising:
  the network security device comprising: a memory and at least one processor;
  a first network switch on a first side of the network security device;
  a second network switch on a second side of the network security device;
  a first network device including a first virtual firewall (VF) and hosting a first virtual machine (VM); and
  a second network switch including a second VF and hosting a second VM, wherein the first VF of the first network device is configured to:
    receive a network packet from the first VM to be sent over a network to the second VM hosted the second network device, wherein the network packet comprises a first medium access control (MAC) address identifying the first VM and a second MAC address identifying the second VM,
    translate the first MAC address of the network packet to a third MAC address for the first VM hosted by the first network device, wherein the third MAC address belongs to a first network interface connected to the first network switch on the first side of the network security device,
    translate the second MAC address of the network packet to a fourth MAC address for the second VM hosted by the another network device, wherein the fourth MAC address belongs to a second network interface connected to the second network switch on the second side of the network security device, and
    transmit the network packet over the network through the first network switch, the network security device, and the second network switch to a second VF of the second network device hosting the second VM based on the third MAC address and the fourth MAC address.

14. The system of claim 13, wherein the second VF of the second network device is configured to:
  receive the network packet from the first VF of the first network device, wherein the network packet comprises the third MAC address and the fourth MAC address;
  translate the third MAC address of the network packet to the first MAC address identifying the first VM hosted by the first network device;
  translate the fourth MAC address of the network packet to the second MAC address identifying the second VM hosted by the second network device; and
  pass the network packet to the second VM based on the second MAC address.

15. The system of claim 13, further comprising a VF controller configured to maintain one MAC address belonging to the first side of the network security device and another MAC address belonging to the second side of the network security device for each VM in the network, wherein the first VF is configured to:
  request from the VF controller the third MAC address that belongs to the first network interface connected to the first network switch on the first side of the network security device for the first VM hosted by the first network device; and
  request from the VF controller the fourth MAC address that belongs to the second network interface connected to the second network switch on the second side of the network security device for the second VM hosted by the second network device.

16. The system of claim 13, wherein the first MAC address identifying the first VM comprises a source address of the network packet, and wherein the second MAC address identifying the second VM comprises a destination address of the network packet.

17. The system of claim 13, wherein the first MAC address identifying the first VM belongs to the first network interface and the second MAC address identifying the second VM belongs to a third network interface, both belonging to the first side of the network security device, and wherein the network packet bypasses the network security device when the network packet is transmitted from the first VM hosted by the first network device to the second VM hosted by the second network device based on the first MAC address and the second MAC address.

18. The system of claim 13, wherein the network security device comprises an intrusion prevention system (IPS) device.

19. The system of claim 13, wherein the first network device comprises a first server executing the first VF and hosting the first VM, and wherein the second network device comprises a second server executing the second VF and hosting the second VM.

* * * * *